(12) United States Patent
Busaba et al.

(10) Patent No.: US 7,082,517 B2
(45) Date of Patent: Jul. 25, 2006

(54) SUPERSCALAR MICROPROCESSOR HAVING MULTI-PIPE DISPATCH AND EXECUTION UNIT

(75) Inventors: Fadi Y. Busaba, Poughkeepsie, NY (US); Klaus J. Getzlaff, Schoenaich (DE); Christopher A. Krygowski, Lagrangeville, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 10/435,806

(22) Filed: May 12, 2003

(65) Prior Publication Data

US 2004/0230772 A1    Nov. 18, 2004

(51) Int. Cl.
*G06F 9/30* (2006.01)
*G06F 15/00* (2006.01)

(52) U.S. Cl. .................................... 712/214
(58) Field of Classification Search .................. 712/23, 712/214, 233; 711/208
See application file for complete search history.

(56) References Cited

U.S. PATENT DOCUMENTS 4,766,566 A * 8/1988 Chuang ........................ 712/23
4,916,652 A * 4/1990 Schwarz et al. ............. 708/510
5,155,817 A * 10/1992 Kishigami et al. ........... 712/218
5,530,825 A * 6/1996 Black et al. .................. 711/213

OTHER PUBLICATIONS

Schwarz, E. M. et al. "The microarchitecture of the IBM eServer z900 processor." IBM J. Res. & Dev. IBM: 2002.*

* cited by examiner

*Primary Examiner*—Eddie Chan
*Assistant Examiner*—Ryan Fiegle
(74) *Attorney, Agent, or Firm*—Lynn L. Augspurger

(57) ABSTRACT

In a computer system for use as a symetrical multiprocessor, a superscalar microprocessor apparatus allows dispatching and executing multi-cycle and complex instructions Some control signals are generated in the dispatch unit and dispatched with the instruction to the Fixed Point Unit (FXU). Multiple execution pipes correspond to the instruction dispatch ports and the execution unit is a Fixed Point Unit (FXU) which contains three execution dataflow pipes (X, Y and Z) and one control pipe (R). The FXU logic then execute these instructions on the available FXU pipes. This results in optimum performance with little or no other complications. The presented technique places the flexibility of how these instructions will be executed in the FXU, where the actual execution takes place, instead of in the instruction decode or dispatch units or cracking by the compiler.

13 Claims, 4 Drawing Sheets

| STAGE 1 | STAGE 2 | STAGE 3 | STAGE 4 | STAGE 5 | STAGE 6 |
|---|---|---|---|---|---|
| DECODE | ADDRESS ADD | CACHE ACCESS C1 | CACHE ACCESS OPERAND READ C2 | EXECUTION | WRITE BACK |
| DCD | AA | EM1 | E0 | E1 | WB |

PROCESSOR PIPELINE STAGES

FIG.3

| NON SUPERSCALAR INSTRUCTION DISPATCH TYPE | DISPATCH PIPE | | | CONTROL SIGNALS | |
|---|---|---|---|---|---|
| | R | S | T | R_MPATH_S | S_MPATH_T |
| N1 | X | | | 1 | 0 |
| N2 | X | | | 1 | 1 |
| N3 | | X | | 0 | 1 |
| N4 | | | X | 0 | 0 |

FIG.5

| INSTRUCTION | EXECUTION | CARRY VALUE AS A FUNCTION OF CONDITION CODE (CC) |
|---|---|---|
| ALC, ALCG, ALCR, ALCGR | OP1 + OP2 + C | C = 1 WHEN (CC = 1 WHEN CC = 2 OR CC = 3) |
| SLC, SLCG, SLCR, SLCGR | OP1 − OP2 + C | C = 1 WHEN (CC = 1 WHEN CC = 2 OR CC = 3) |

FIG.6

| DISPATCHED INSTRUCTIONS GROUPS | $\dashrightarrow$ TIME THROUGH PIPELINE STAGES | | | | |
|---|---|---|---|---|---|
| GROUP i | C1 | C2 | EX | PA | |
| ALCR | AA | C1 | C2 | EX | PA |
| GROUP (i+2) | | AA | C1 | C2 | EX |

FIG.7

SUPERSCALAR MICROPROCESSOR HAVING MULTI-PIPE DISPATCH AND EXECUTION UNIT

FIELD OF THE INVENTION

This invention relates to computer architecture and particularly to a superscalar microprocessor for implementation of multiple pipe execution of complex instructions for use with IBM's architecture as used by IBM and others.

Trademarks: IBM® is a registered trademark of International Business Machines Corporation, Armonk, N.Y., U.S.A. S/390, Z900 and z990 and other product names may be registered trademarks or product names of International Business Machines Corporation or other companies.

BACKGROUND

The efficiency and performance of a processor is measured in IPC, the number of instructions executed per cycle. In a superscalar processor, instructions of the same or different types are dispatched and executed in parallel in multiple execution units. Each instruction dispatch port is typically connected to one execution pipe and certain type of instructions are always issued in a specific port since they can only be executed in a specific execution unit. The execution units work independently, in parallel and any dependency among instructions are detected before a group of instructions is formed and dispatched. In a typical superscalar processor, a decoder feeds an instruction queue, from which the maximum allowable number of instructions are issued per cycle to the available execution units. This is called the grouping of the instructions. The average number of instructions in a group, called size, is dependent on the degree of instruction-level parallelism (ILP) that exists in a program. In a typical processor, the Fixed Point Unit (FXU) is designed to handle the most frequent simple instructions that only require one cycle of execution. Typically such instructions are Loads, Stores, Binary Arithmetic and Logical operations. For complicated instructions that require many cycle of execution, instructions are cracked (as described in papers of Intel Corporation and present in IBM's Power 4 processors using the IBM's pSeries workstations) to many simple instructions that can be dispatched in parallel to the many execution pipes. The execution of such complicated instructions may still require many execution cycles. During each of these cycles a subset of cracked instructions are executed. The cracking of instructions increases the decode area, the decode time, and are hard to apply to complicated architectures such as the IBM mainframe S/390 ESAME instruction set which were described in IBM's Enterprise Systems Architecture Principles of Operation (SA22-7201-06) and as repeated in IBM's zArchitecture Principles of Operation SA22-7832-00, December 2000. Other complications are exception detection and reporting, serialization, error detection and recovery. Due to the listed complications, cracking is found to degrade performance and add significant logic area and complexity if applied to S/390 architecture. Other solutions to the complicated multi-cycle execution instructions are to assign or dispatch them to one dedicated FXU pipe which isolates them from the commonly executed single cycle instructions. The logic in the multi-cycle FXU pipe, which can be pipelined or not, is allowed to spin as many cycles as it requires to execute these instructions. The multi-cycle FXU pipe is good for out-of-order processors, but it does not add any benefits to in-order processors since no new instructions are allowed to be dispatched unless the multi-cycle instruction has finished executing. While the z900 IBM microprocessor could execute 64 bit instructions of the zArchitecture with a millicode implementation, it would be desireable to execute IBM's ESAME and IBM's zArchitecture is a more efficient manner.

SUMMARY OF THE INVENTION

The invention describes the processor apparatus for execute IBM's ESAME and IBM's zArchitecture with the subject superscalar microprocessor as one of the processors used in the symmetrical multiprocessors of IBM's traditional and new systems which enables a more efficient manner dispatching and executing multi-cycle and/or complex instructions in the Fixed Point Unit (FXU) that maximizes performance without impacting other areas such as decode, grouping or dispatch. This invention provides multiple pipes for a multi-cycle execution instruction, and specifically multiple execution pipes correspond to the instruction dispatch ports and the execution unit is a Fixed Point Unit (FXU) which contains three execution dataflow pipes (X, Y and Z) and one control pipe (R). The invention enables use of a dispatch unit which dispatches both ESAME and zArchiture instructions for execution by one or more of its FXU pipes with replication of the opcode to all of the execution pipes in parallel. A few control signal are generated to control which pipes will be used for execution of the instruction. The FXU then decides how the instruction is to be executed in the available FXU pipes. This provides the FXU with ability to utilize all the hardware resources, in all of the FXU execution pipes, for the execution of this instruction. This method results in optimum performance and little or no complication to the exception logic, error detection or recovery logic. The presented technique places the flexibility of how these instructions will be executed in the FXU, where the actual execution takes place, instead of in the instruction dispatch unit (or compiler in the case of VLIW) as discussed in the background to this invention.

These and other improvements are set forth in the following detailed description. For a better understanding of the invention with advantages and features, refer to the description and to the drawings.

DESCRIPTION OF THE DRAWINGS

FIG. 3 illustrates the processor pipeline stages.

FIG. 5 illustrates the logic values of control signals for dispatching various multi-cycle and complex instructions.

FIG. 6 illustrates the Execution of Add Logical with Carry and Subtract Logical with Borrow Instructions.

FIG. 7 illustrates Instructions flow in Subject Processor Pipeline.

Our detailed description explains the preferred embodiments of our invention, together with advantages and features, by way of example with reference to the drawings.

DETAILED DESCRIPTION OF THE INVENTION

Figure 4:
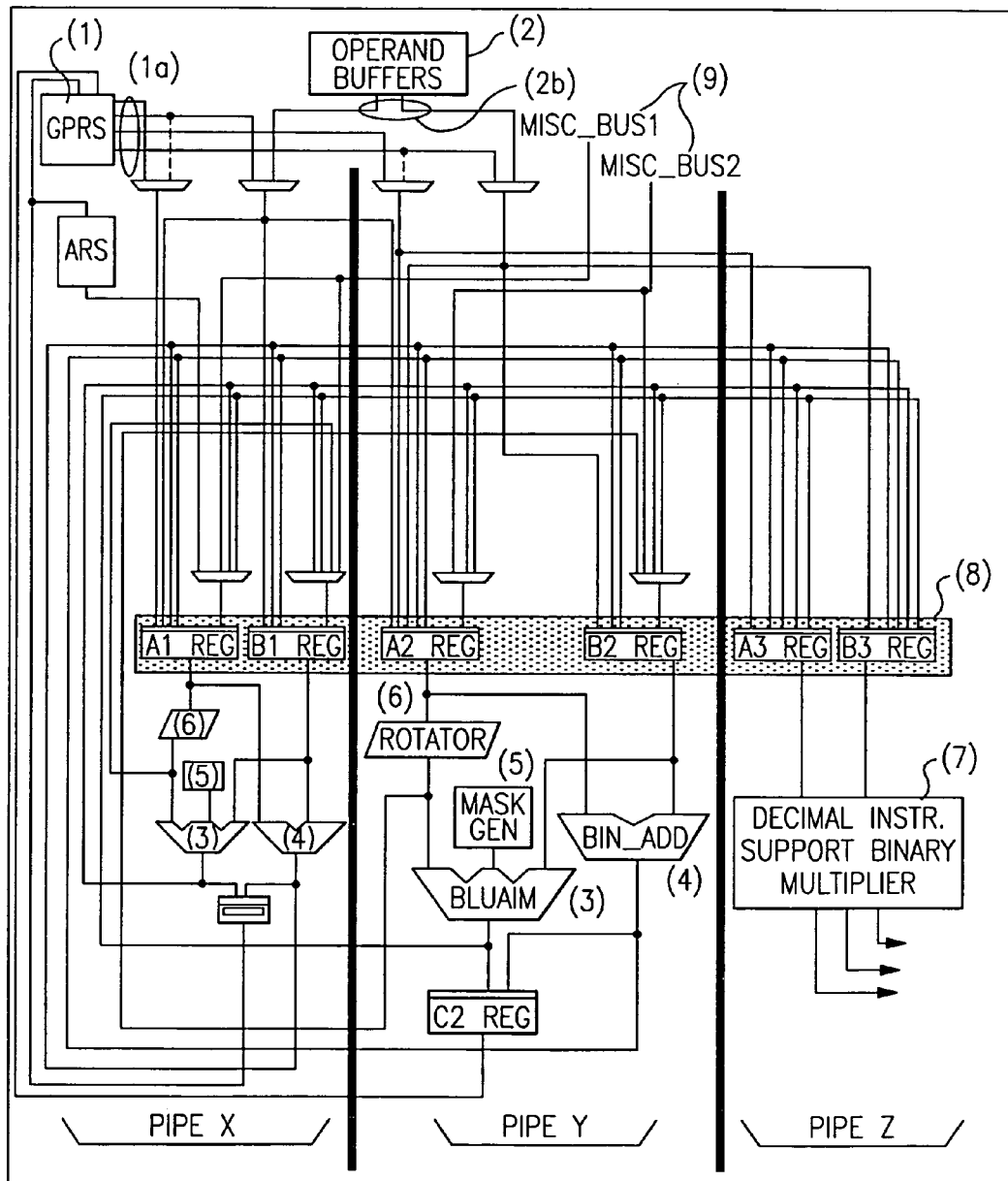
FIG. 4 shows the preferred embodiment of the superscalar microprocessor with the FXU for the z900 processor where our preferred embodiment is implemented.

As an introduction, in the environment in which our preferred embodiment is used in a superscalar processor. A "Superscalar" instruction means chat the instruction can be issued with other instructions and only require one cycle of execution inside the Fixed Point Unit (FXU). FIG. 4 shows a diagram of the FXU data flow where our invention is implemented. IBM in its prior z900 products as described by E. Schwartz et al in the IBM's Journal of Research & Development Vol. 46 (2002) p 464 entitled "*The microarchitecture of the IBM eServer z900 processor*" describes the micro-architecture of the processor which performs the execution of the instructions of IBM's zArchitecture Principles of Operation, SA22-7832-00. The research article describes the Execution Unit, specifically The FXU, and shows its data flow in FIG. 8 of the article. The FXU in E. Schwartz. Al article and prior IBM z900 processors is a single scalar that can only executes single instruction at a time. The FXU data flow of the subject processor illustrated by the Figures where our invention is implemented, see FIG. 4. is a superscalar pipeline consisting of three fixed point data flow pipes named Pipe X, Pipe Y and Pipe Z. In accordance with our preferred embodiment of our invention we have provided on the read and write ports on the General Purpose Register (GPR) (1) and operand buffer (2) to support the execution of many instrfictions simultaneously. For example, the GPR read ports (1*a*) has increased from 2 ports to 4. similarly, the operand buffer (2) read ports (2*b*) has increased from 1 to 2. All these read ports are 64-bits wide. The multiplex structure into the working registers (8) for the data flow where test under mask instructions are implemented is different from that shown in FIG. 8 of the research article. There are some similarities in the data flow for Pipes X and Y and the data flow of the research article. Each of these pipes includes a bit logical and insert macro (3), a binary adder (4), a mask generator (5), and two working register (8) A-reg and B-reg. Pipe Z contains a decimal adder, a binary multiplier, and a decimal assist macro (7) that are used for execution of the specialized and complex instructions.

The following description is of a computer system pipeline where our preferred embodiment is implemented. The basic pipeline sequence for a single instruction is shown in FIG. 3. The illustrated pipeline should be understood to show implicitly an instruction fetch from the Instruction Cache (I-Cache). After fetching and as shown, during the decode stage (DcD), the instruction is decoded, and the B and X registers are read to generate the memory address for the operand fetch. During the Address Add (AA) cycle, the displacement and contents of the B and X registers are added to form the memory address. Two cycles are required to access the Data cache (D-cache) and transfer the data back to the execution unit (C1 and C2 stages) for the processor where the instructions are implemented. Also, during C2 cycle, the register operands are read from the register file and stored in working registers in preparation for execution. Instruction execution occurs during the E1 stage, and the WB stage is when the result is written back to register file or stored away in the D-cache. Instruction grouping occurs in the AA cycle, and groups are issued during the EM1 cycle, which overlaps with the C1 cycle. Up to three instructions can be dispatched in parallel to the FXU. The dispatch ports are referred to as R, S and T. Branches are dispatched on port R and other instructions are dispatched in to ports S and T. A superscalar processor contains multiple execution pipes that correspond to the instruction dispatch ports. The Fixed Point Unit (FXU) in our preferred embodiment contains three execution dataflow pipes (X, Y and Z) and one control pipe R no data flow element is associated with it). Superscalar branch instruction dispatched on port R are executed on FXU control pipe R, and other superscalar instructions issued on ports S and T are executed on FXU pipes X and Y. The FXU dataflow pipe Z contains specialized hardware for multi-cycle instructions such as binary multiplies, decimal instructions, binary to decimal conversion, decimal to binary conversion, data formatting instructions, etc. A Group of dispatched superscalar instructions may consist of the following combinations of instructions.

S1) A superscalar branch instruction issued alone on pipe R.
S2) Two superscalar instructions issued on pipes R and S.
S3) Three superscalar instructions issued on pipes R, S and T.
S4) A superscalar instruction issued on pipe S.
S5) Two superscalar instructions issued on pipes S and T.

A multi-cycle execution instruction is a non superscalar instruction issued alone in the subject processor. Non superscalar instructions are dispatched alone on dispatch ports R or S.

Figure 1:
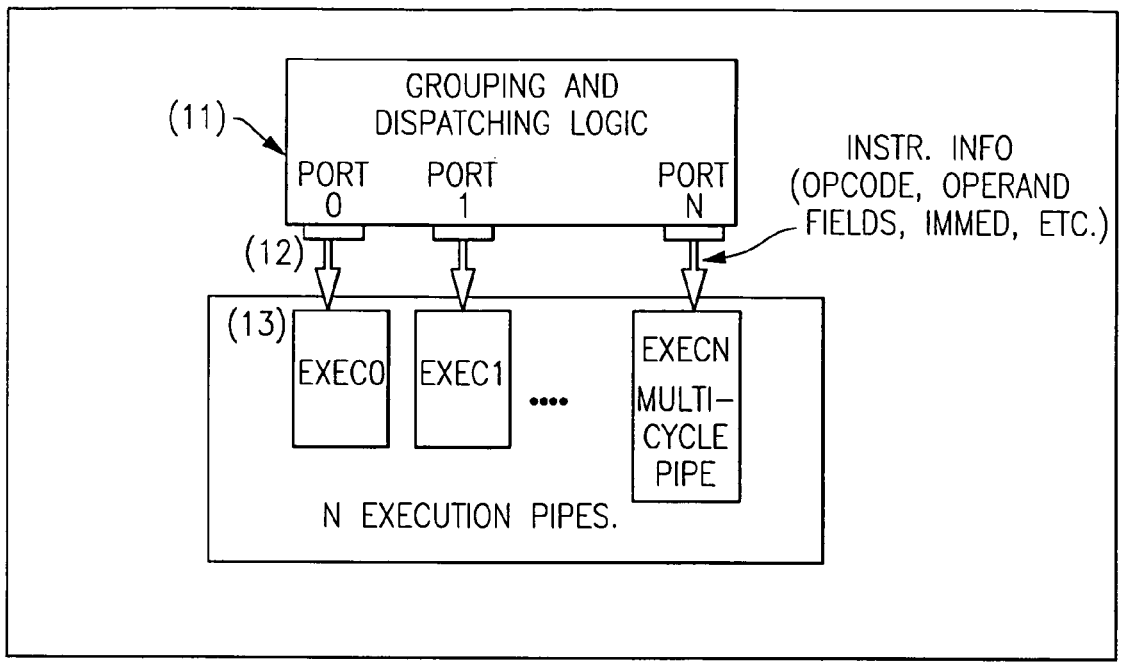
FIG. 1 illustrates a processor system with N dispatch ports and N execution pipes.

FIG. 1 shows a processor with N dispatch ports and N execution pipes. Instructions that require many cycles of execution are either dispatched to a specific execution pipe as in ExecN in FIG. 1, or is cracked into many simple instructions that can be grouped and dispatched together. As mentioned earlier, a dedicated execution pipe is best fit for out-of-order processors where instructions are allowed to be dispatched and executed while a multi-cycle instruction is being executed. On the other hand, the cracking of instructions adds more area to instruction queues, complicates recovery and exception handling, degrades performance, and is difficult if not impossible to apply to the z900 instruction set without significant degradation in performance.

Figure 2:
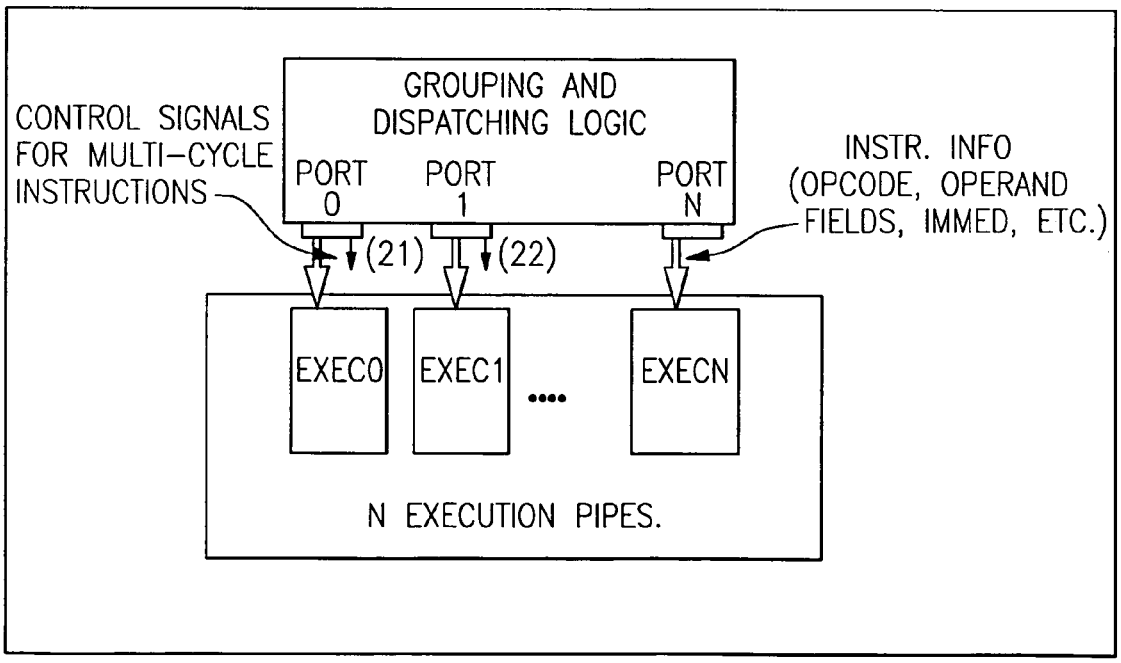
FIG. 2 illustrates the modifications made to dispatch ports and execution pipes for the method of the preferred embodiment.

To overcome these problems, the method disclosed dispatches the multi-cycle instructions to one of the ports, but duplicates the opcode on all of the dispatch ports. Few additional control signals are sent with each dispatched multi-cycle instruction. Since the multi-cycle instruction is dispatched alone, the FXU can use all of it's execution pipes to simplify and speed up the execution of these instructions. This technique allows the maximum flexibility in implementing execution algorithms for these instructions. For example, the execution of these instructions can simultaneously utilize all of the GPR read/write ports, all of the cache read and store ports, all of the binary adders, logic units, rotators, etc. Exception handling and recovery is simplified since there is one instruction undergoing execution and the exception and recovery logic knows the state of execution and thus knows when exception and recovery can be reported. Since these instructions are decoded and dispatched similar to the other non multi-cycle instructions, this method adds negligible area overhead. The only added function required involved replication of the opcode and generation of a few simple control signals (2 control signals in the processor where our method is implemented). FIG. 2 shows a logic diagram for such an implementation where control signals (21) and (22) are added with dispatch port0 and port1. For the processor used to implement our method, 2 control signals are added with each dispatch port as shown in FIG. 5. Non superscalar instruction dispatch types N1 through N4 are described as follows.

N1) A non superscalar branch instruction issued on port R but executed on both pipes R and X. An example of this type of instruction is a Loop branch. Pipe S is used for decrementing of the operand and pipe R is used for branch resolution.

N2) A non superscalar branch instruction issued on port R but executed on pipes R, X and Y. Milli-entry is an example where all of the execution pipes are required for the operation.

N3) A non superscalar instruction issued on port S but executed on Pipes X, Y and Z. These instructions include most of the complicated operations such as decimal multiplication, decimal division, data conversion operations, etc.

N4) A non superscalar instruction issued on port S and executed on pipe X only. The reason the instruction is non superscalar are either due to architecture (e.g. serialization instructions) or implementation. For example, SS logical instructions NC, XC, CLC, OC require the same execution pipeline for more then one cycle.

DIRECT APPLICATION OF THE INVENTION

As a result of this dispatch and execution implementation, it is possible to improve the performance (reduce the number of cycles required for execution) for many instructions. We will present the implementation of Add Logical with Carry and Subtract Logical with Borrow instructions using this method.

The execution of Add Logical with Carry (ALC, ALCG, ALCR, ALCGR) and Subtract Logical with Borrow (SLB, SLBG, SLBR, SLBGR) instructions depends of the value of Condition Code (CC) as shown of the table of FIG. 6. The operational dependency on CC raises a challenge on implementing these instructions in a single cycle. The Condition Code may be set by any previous instruction and in particular by the instruction just preceding the Add Logical with Carry and Subtract Logical with Borrow. FIG. 7 shows the execution flow for ALCR instruction (any other instruction in FIG. 6 can be used for this example) in the processor pipeline. As shown in FIG. 7, the condition code may be set by Group i during its Execution Stage (EX) and is needed by the ALCR instruction during it's C2 stage so that all control inputs are latched outputs during the EX stage of ALCR. The CC logic is the most timing critical path in the FXU since it is dependent on the execution results; therefore, the CC output during the EX cycle of Group i can never be used to set the Carry input to the binary adder in the C2 cycle of ALCR without any increase to the cycle time delay of the processor. Two cycles of execution are required for instruction ALCR execution in previous implementation to resolve the CC dependency.

Our implementation of these instructions based on the presented method requires only one cycle of execution. These instructions are treated as non superscalar (N3) type. In other words, these instructions are issued on port S and executed on both X and Y pipes with control signal s_mpath_t being set. During the EX stage the FXU executes this instruction on both S and T pipes. On the S-pipe, the binary adder calculates Op1+Op2+0 assuming a CC value of 0 or 1, while on the T-pipe the binary adder calculates Op1+Op2+1 assuming a CC value of 2 or 3. During the EX cycle of ALCR when the CC value is examined from a latch, the GPR write control signal for the pipe containing the incorrect result is then disabled.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A superscalar processor in which instructions of the same or different types are dispatched and executed in parallel in multiple execution units, comprising:
   a decoder unit for decoding fetched complex and specialized multi-cycle execution instructions and for loading them into an instruction queue buffer;
   a dispatch unit for examining the loaded complex multifunctional or multi-cycle instructions in said instruction queue buffer and grouping them for execution, and dispatching said grouped complex multifunction and multi-cycle instructions via instruction dispatch ports to a fixed point execution unit (FXU) for execution of the dispatched instructions in parallel in multiple execution pipelines of said superscalar processor, and
   wherein the dispatch unit groups and dispatches the instructions upon encountering a multifunctional or multi-cycle execution instruction and dispatches it alone to a single port of the FXU but duplicates the instruction's text to other ports, and
   wherein the execution of the multifunctional or multi-cycle execution instruction is capable of being distributed across the multiple execution pipelines.

2. The superscalar processor according to claim 1 wherein there are three multiple execution pipes, two of which pipes are like pipes each capable of executing like instructions in parallel, and a third pipe is provided for execution of complex and specialized instructions in parallel with execution of instructions in the other pipes.

3. The superscalar processor according to claim 1 wherein the fixed point execution unit provides a superscalar pipeline comprising three fixed point data flow pipes, and wherein is provided a plurality of 64-bit wide General Purpose Register (GPR) read and write ports of said FXU and a plurality of operand buffers for loading said instructions into said instruction queue buffer to support the execution of many instructions simultaneously.

4. The superscalar processor according to claim 3 wherein there are three multiple execution pipes, two of which pipes are like pipes each capable of executing like instructions in parallel, and a third pipe is provided for execution of complex and specialized instructions in parallel with execution of instructions in the other pipes.

5. The superscalar processor according to claim 2 wherein there are four GPR read ports and two operand buffer read ports and these read ports are 64-bits wide.

6. The superscalar processor according to claim 5 wherein two of said three data flow pipes are like pipes with each of said two of said three pipes including a bit logical and insert macro, a binay adder, a mask generator, and two working registers, an A-reg and a B-reg.

7. The superscalar processor according to claim 6 wherein the third of said three data flow pipes is a specialized pipe for complex instructions which contains a decimal adder, a binary multiplier, and a decimal assist macro for execution of the specialized and complex instructions.

8. The superscalar processor according to claim 1 wherein said multiple execution pipes correspond to the instruction dispatch ports and the execution unit is a Fixed Point Unit (FXU) which contains three execution data flow pipes (X, Y and Z) and one control pipe.

9. The superscalar processor according to claim 2 wherein one of said pipes contains specialized hardware for multicycle instructions including binary multiplies, decimal instructions, binary to decimal conversion, decimal to binary conversion, and data formatting instructions.

10. The superscalar processor according to claim 2 wherein said instruction dispatch ports dispatch superscalar instructions consisting of one or more of the following combinations of instructions:
S1) a superscalar branch instruction issued alone on a pipe; or
S2) two superscalar instructions issued on two pipes; or
S3) three superscalar instructions issued on three pipes;
S4) a general superscalar instruction issued on a pipe which differs from the pipe to which said superscalar branch instruction is issued.

11. The superscalar processor according to claim 2 wherein said a multi-cycle execution instruction is a non superscalar instruction issued alone in the superscalar processor.

12. The superscalar processor according to claim 11 wherein non superscalar instructions are dispatched alone on one of two different instruction dispatch ports.

13. The superscalar processor according to claim 12 wherein the decoder unit marks each complex multifunctional or multi-cycle instruction with two bits identifying the manner by which it should be dispatched and executed.

* * * * *